M. H. SHOENBERG.
COMBINED SIGHT GAGE AND VALVE.
APPLICATION FILED DEC. 27, 1919.
1,346,725.  Patented July 13, 1920.
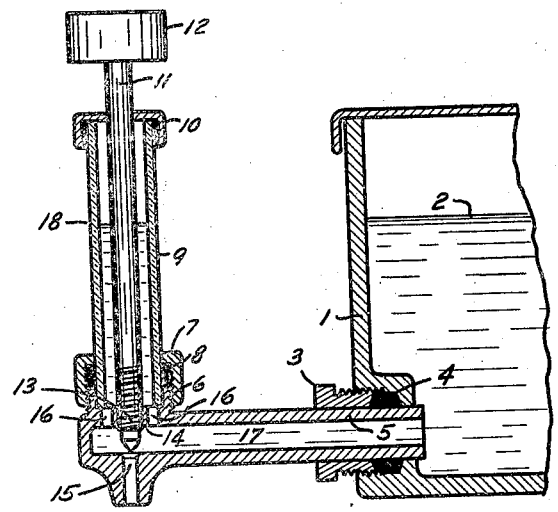
— Fig 2 —
— Fig 1 —
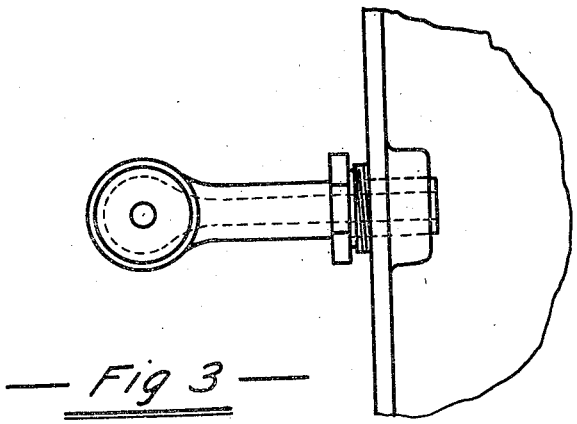
— Fig 3 —
INVENTOR
Milton H Shoenberg
BY
Miller & Henry
ATTORNEYS

UNITED STATES PATENT OFFICE.

MILTON H. SHOENBERG, OF SAN FRANCISCO, CALIFORNIA.

COMBINED SIGHT-GAGE AND VALVE.

1,346,725.  Specification of Letters Patent.  Patented July 13, 1920.

Application filed December 27, 1919. Serial No. 347,733.

*To all whom it may concern:*

Be it known that I, MILTON H. SHOENBERG, a citizen of the United States, and a resident of the city and county of San Francisco, State of California, have invented new and useful Improvements in Combined Sight Gages and Valves, of which the following is a specification.

My invention has for its object a simple and efficient construction of a combined sight gage and valve especially applicable to shallow containers, as for example: medical and dental sterilizers, or the like, and consists of a vertical transparent column, having connection with a vessel of which it is desired to indicate the height of contained liquid, and a valve and stem disposed within said colmun operable from above the liquid surface, and adapted to utilize the passage which connects from the vessel to the gage, as providing also a path for the liquid which may be discharged through the valve.

By referring to the accompanying drawings, which illustrate a preferred form, my invention will be made clear.

Figure 1 is a front elevation showing my combined gage and valve.

Fig. 2 is a cross section of Fig. 1 on the line II—II and at right angles to Fig. 1.

Fig. 3 is a plan view of Fig. 2.

Throughout the figures similar numerals refer to identical parts.

The container for liquid is indicated by the numeral 1, and the liquid surface therein is shown at 2. A communicating passage is provided through the wall of the container and fitted with sealing means indicated in the drawings by the gland 3 and packing material 4, which are adapted to seal against leakage around tube 5. The opposite end of the tube 5 is provided with an extending boss 6 and gland 7, and packing material 8, adapted to secure the sight gage glass or other transparent member 9 in place. On the top of the gage column I prefer to mount a cap 10 centrally perforated and through which extends the valve rod 11 operated by the head 12.

On the lower end of the valve rod 11 is cut the screw thread 13 engaging through the wall 14, which is integral with the tubular portion 5, and which tubular portion also carries the valve seat 15 on its lower wall, in conjunction with which the end of the valve rod coöperates.

The rotation of the head 12 raises or lowers the valve rod 11 by the screw threads 13 from or toward valve seat 15 admitting a greater or less quantity, or closing entirely the flow of liquid from the container 1 through 17 and the outlet 15. The interior of the tube 9, connects by the passages 16, 16 with the channel 17, and therefore with the liquid in the container 1, so that the elevation of the surface 2 is indicated at 18 in the gage tube.

The operation is as follows:

The rotation of the head 12 of the valve stem 11 opens or closes the outlet 15 as may be required and the liquid rising in the glass tube 9 indicates the elevation of the liquid 2 in the closed container 1.

I claim:

1. The combination of a liquid level indicator and valve means, comprising a glass tube, a base for said tube having tubular means adapted to communicate with the interior of a vessel and communicating with the glass tube; a valve rod disposed through the glass tube and having its end formed to coöperate with a passage way through the wall of the tubular communicating means.

2. The combination of a liquid level indicator and valve means, comprising a glass tube, a base for said tube having tubular means adapted to communicate with the interior of a vessel and communicating with the glass tube; a valve rod disposed through the glass tube and having its end formed to coöperate with a passageway through the wall of the tubular communicating means, and means for raising and lowering said valve rod.

3. The combination of a liquid level indicator and valve means, comprising a glass tube, a base for said tube having tubular means adapted to communicate with the interior of a vessel and communicating with the glass tube; a valve rod disposed through the glass tube and having its end formed to coöperate with a passageway through the wall of the tubular communicating means, and means for raising and lowering said valve rod, comprising a screw thread engaging a tapped hole.

4. The combination of a liquid level indicator and valve means, comprising a glass tube, a base for said tube having tubular means adapted to communicate with the interior of a vessel and communicating with the glass tube; a valve rod disposed through the glass tube and having its end formed to coöperate with a passageway through the wall of the tubular communicating means, and means for raising and lowering said valve rod, comprising a screw thread engaging a tapped hole, said hole in a wall of the passageway substantially opposite the said outlet opening.

5. The combination with a gage glass comprising a glass tube and metallic base therefor; supporting means connecting the base and said tube and packing therefor; a cap disposed on the top of the said tube and perforated for a rod and a passageway through said base constructed and adapted to permit the flow of liquid through the said base to the interior of the glass tube, the opposite walls of said base drilled on the axis of the glass tube, the hole in the wall adjacent to the glass tube threaded to coöperate with similar threads cut upon the valve rod, the said valve rod constructed and adapted on its lower end to open and close the hole in the other wall of the base.

In testimony whereof I have hereunto set my hand at the city and county of San Francisco, California.

MILTON H. SHOENBERG.